United States Patent

Gercekci

[11] Patent Number: 5,563,945
[45] Date of Patent: Oct. 8, 1996

[54] DATA STORAGE DEVICE

[75] Inventor: Anil Gercekci, Geneva, Switzerland

[73] Assignee: Motorola Inc., Schaumburg, Ill.

[21] Appl. No.: 203,061

[22] Filed: Feb. 28, 1994

[30] Foreign Application Priority Data

Mar. 20, 1993 [GB] United Kingdom ............ 9305827

[51] Int. Cl.⁶ ............................................. H04L 9/00
[52] U.S. Cl. ............................ 380/4; 380/25; 380/49
[58] Field of Search ............................. 380/4, 23–25, 380/49; 395/475, 750

[56] References Cited

U.S. PATENT DOCUMENTS

| 4,168,396 | 9/1979 | Best | 380/49 |
|---|---|---|---|
| 4,278,837 | 7/1981 | Best | 380/49 |
| 4,583,196 | 4/1986 | Koo | 395/575 |
| 4,757,536 | 7/1988 | Szczutkowski et al. | 380/49 |
| 5,237,610 | 8/1993 | Gammie et al. | 380/23 |
| 5,237,611 | 8/1993 | Ramussen et al. | 380/21 |
| 5,237,699 | 8/1993 | Little et al. | 395/750 |
| 5,325,430 | 6/1994 | Smyth et al. | 380/4 |
| 5,455,862 | 10/1995 | Hoskinson | 380/21 |

FOREIGN PATENT DOCUMENTS

| 0121853A2 | 10/1984 | European Pat. Off. | G06F 12/14 |
|---|---|---|---|
| 0128672A1 | 12/1984 | European Pat. Off. | |
| 2205667 | 12/1988 | United Kingdom. | |

Primary Examiner—Salvatore Cangialosi
Attorney, Agent, or Firm—Paul J. Polansky

[57] ABSTRACT

A data storage device (9) comprises an array of electronic memory locations (20) for storing data. An address input terminal (10) provides coupling to an address source and is coupled to provide first address signals from the address source to address the memory locations of the array (20). A data output terminal (12) provides coupling to a data reception arrangement and is connected to the array (20) for receiving data signals therefrom in response to the address signals. The data signals are indicative of the data stored in the memory locations addressed by the address signals. An address encryption arrangement (14) is coupled between the address input terminal (10) and the array (20) for encrypting the first address signals. The address encryption arrangement (14) contains encrypting data which is protected from direct optical determination, the encrypting data being used to encrypt the first address signals.

19 Claims, 1 Drawing Sheet

DATA STORAGE DEVICE

FIELD OF THE INVENTION

This invention relates generally to data storage devices.

BACKGROUND OF THE INVENTION

Data storage devices, for example, smart cards containing bank account details in the form of data values stored in integrated circuit (IC) memory addresses, are at risk from fraudulent optical detection by the removal of the plastic encapsulation around the IC, etching away covering layers and applying a selectively absorbable stain to render the memory data optically visible.

It is known that address encrypting arrangements may be used, which result in the data values being arranged non-sequentially within the IC memory. The data therefore appears meaningless if optically analysed, but can be legitimately accessed through the address encrypting arrangement. A problem with this arrangement is that by performing the same optical detection techniques as mentioned above, one could learn the encrypting details on which the encrypting arrangement is based and thus could make sense of the data within the IC.

This invention seeks to provide a data storage device in which the above mentioned disadvantage is mitigated.

SUMMARY OF THE INVENTION

A data storage device comprises an array of electronic memory locations for storing data. An address input terminal provides coupling to an address source and is coupled to provide first address signals from the address source to address the memory locations of the memory array. A data output terminal provides coupling to a data reception arrangement and is connected to the memory array for receiving data signals therefrom in response to the address signals. The data signals are indicative of the data stored in the memory locations addressed by the address signals. An address encryption arrangement is coupled between the address input terminal and the array for encrypting the first address signals. The address encryption arrangement contains encrypting data which is protected from direct optical determination, the encrypting data being used to encrypt the first address signals.

The array of data memory may be a Read-Only-Memory containing data which is stored in an encrypted manner, the encryption thereof being matched with the arrangement of the encrypting data.

The address encryption arrangement may include a latch for receiving the encrypting data from the non-volatile-memory, such that the non-volatile-memory can operate independently from the address encryption arrangement during normal operation.

It will be appreciated that in this way one cannot learn the encrypting details on which the encrypting arrangement is based and thus sense cannot be made of the data within the IC.

BRIEF DESCRIPTION OF THE DRAWING

An exemplary embodiment of the invention will now be described with reference to the drawing in which.

DETAILED DESCRIPTION OF A PREFERRED EMBODIMENT

Figure 1:
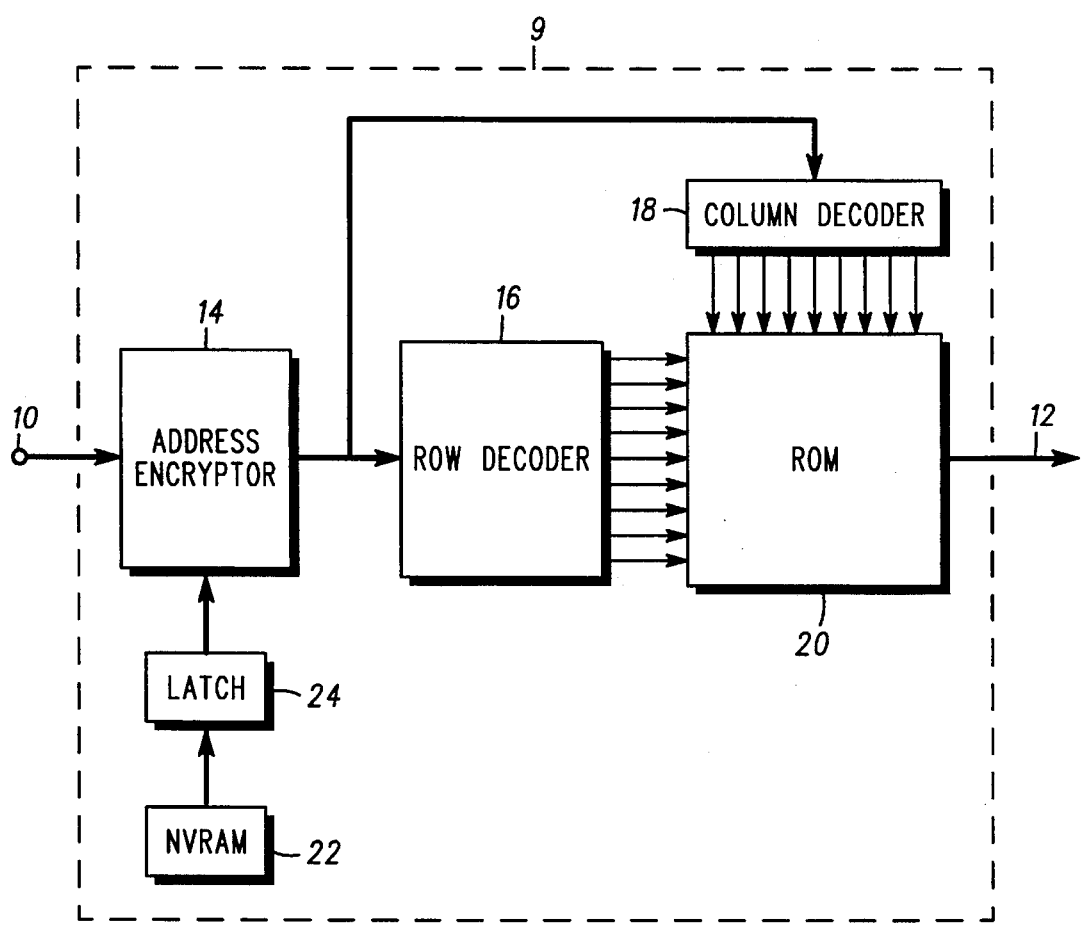
FIG. 1 shows a preferred embodiment of a data storage device in accordance with the invention.

Referring to FIG. 1, there is shown a smart card 9, comprising an address input terminal 10 for receiving address signals from an address drive circuit of the smart card 9 (not shown). The smart card 9 is an integrated circuit fabricated on a silicon wafer.

An address encryptor 14 is connected to the address input terminal 10 for encrypting the address signals received therefrom according to an encrypting key to be explained hereafter.

A row decoder 16 and a column decoder 18 are independently connected to the address encryptor 14 for providing memory addressing to a read-only-memory (ROM) 20, the addressing being in response to the encrypted address signals from the address encryptor 14.

The ROM 20 contains electronic data which is stored in an array of memory addresses therein. The data is addressed by the row decoder 16 and the column decoder 18 coupled thereto, the ROM 20 providing data signals to a data output terminal 12 in response to being addressed. Each data signal is indicative of the data value stored in the address being addressed.

The physical arrangement of the memory locations of the data memory 20 does not obviously correspond to the address signals received at the address input terminal 10 since these received address signals are encrypted by the encryptor 14. Thus possible optical detection of the contents of the memory locations as referred to above would not afford any sense to be made from the data, unless the encrypting arrangement could also be inspected.

The data output terminal 12 is coupled to receive the data signals from the data memory 20 for providing said data signals to a data processor (not shown) of the smart card 9.

A non-volatile random-access-memory (NVRAM) 22 embodied in a floating gate transistor arrangement is coupled to the address encryptor 14 via a latch 24, for providing the encrypting key thereto in the form of a data value. In operation, and with reference to a first item of data stored in a first memory address of the data memory 20, the smart card 9, during normal operation, may have cause to retrieve the value of the first item of data, which is known to reside in the first memory address.

Accordingly, a first address signal is sent to the address input terminal 10 from the address drive circuit (not shown). The first address signal appears to be indicative of a second memory address, which does not contain the required value. The address encryptor 14 encodes the first address signal according to the encrypting key received from the latch 24.

The decoders 16 and 18 receive the encrypted first address signal, which is now clearly indicative of the first memory address.

The first memory address of the ROM 20 is thus addressed by the decoders 16 and 18 in response to the encrypted address signal, and provides a data signal to the data output terminal 12, the signal being indicative of the first data value stored in the first memory address.

The NVRAM 22 is primarily used for other purposes within the smart card 9, so the latch 24 is employed to receive the data value forming the encrypting key at the commencement of normal operation of the smart card 9, for holding the key and supplying it to the address encryptor 14 during operation so that the NVRAM 22 is isolated from the encryptor 14 and hence the overall performance of the smart card 9 is not hindered by the operation of the address encryptor 14.

It will be appreciated that an attempt to optically detect the contents of the NVRAM 22 using the methods described above for the ROM 20, will not render the encrypting key detectable because floating gate arrangements cannot be inspected using these methods.

The latch 24 can be optically inspected as described above, but it only holds the value of the encrypting key during normal operation and thus if inspected, the latch 24 will not contain the value of the encrypting key. The key is therefore secure.

The address encryptor 14 uses the encrypting key to alter the received first address signal. By way of an example, the encrypting key may be a four digit binary number, and the address encryptor may perform an addition of the key and the first address signal. In this way the encryptor 14 provides the row decoder 16 and the column decoder 18 with the encrypted first address signal.

The encrypting of the first address signal means that the physical location of the first memory address within the ROM 20 does not correspond in any obvious way to the expected physical location thereof, so without knowledge of the encrypting key, calculating the location of, and therefore optically determining the contents of the first memory address is not possible. The same is true for all other memory addresses within the ROM 20.

Furthermore, optical determination of the arrangement of the decoders 16 and 18 and the address encryptor 14 does not afford knowledge of the locations because the encrypting key is secure.

In this way the data contained in the ROM 20 is protected from unauthorised and fraudulent optical determination.

It will be appreciated by one skilled in the art that alternative embodiments to the one hereinbefore described may be achieved, such as the use of the above arrangement in a device other than a smart card, such as a memory cartridge or other data memory device.

It will also be appreciated that the NVRAM 22 may be embodied by alternative technology to the floating gate transistors described above, such as metal/nitride oxide silicon (MNOS) semiconductor technology.

Additionally, an alternative to the ROM 20 may be used, such as another data storage medium, for example an eraseable-programmable-ROM (EPROM).

I claim:

1. A data storage device comprising:

an array of memory locations for storing data;

an address input terminal for coupling to an address source and coupled to provide first address signals from the address source to address the memory locations of the array;

a data output terminal for coupling to a data reception means and connected to the array for receiving data signals therefrom in response to the first address signals, the data signals being indicative of the data stored in the memory locations addressed by the first address signals; and address encryption means coupled between the address input terminal and the array for encrypting the first address signals, including a non-volatile-memory for storing encrypting data, the non-volatile memory protecting the encrypting data from direct optical determination, the address encryption means using the encrypting data to encrypt the first address signals.

2. The device of claim 1 wherein the array of memory locations is a Read-Only-Memory containing data which is stored in an encrypted manner such that the data is matched with the encrypting data.

3. The device of claim 1 wherein the address encryption means includes a latch for receiving the encrypting data from the non-volatile-memory, such that the non-volatile-memory can operate independently from the address encryption means during normal operation.

4. The device of claim 1 wherein the device is fabricated on a semiconductor integrated circuit.

5. A smart card comprising a data storage device constructed in accordance with claim 1.

6. A smart card comprising a data storage device constructed in accordance with claim 2.

7. A smart card comprising a data storage device constructed in accordance with claim 3.

8. A smart card comprising a data storage device constructed in accordance with claim 4.

9. A data storage device comprising:

an array of memory locations for storing data;

an address input terminal for coupling to an address source and receiving first address signals from the address source;

a data output terminal for coupling to a data reception circuit and connected to the array for receiving data signals therefrom at a memory location indicated by second address signals; and an encryptor addressing circuit having an input coupled to the address input terminal, and an output for providing the second address signals, the encryptor addressing circuit encoding the first address signals according to an encryptor key to provide the second address signals;

the encryptor addressing circuit including a non-volatile memory having a first memory storage location for storing the encryptor key the non-volatile memory protecting the encryptor key from direct optical determination, the encryptor addressing circuit using the encrypting data to encrypt the first address signals to provide the second address signals.

10. The data storage device of claim 9 wherein the encryptor addressing circuit further comprises:

a latch having an input coupled to the first memory storage location, and an output; and an address encryptor having an input coupled to the latch, and an output coupled to an address input of the array.

11. The data storage device of claim 10 wherein the non-volatile memory stores the encryptor key using floating gate transistors.

12. A smart card comprising a data storage device construction in accordance with claim 11.

13. The data storage device of claim 10 wherein the non-volatile memory comprises a plurality of second memory storage locations for storing data during a normal operation mode of the data storage device.

14. The data storage device of claim 9 characterized as being a smart card integrated circuit.

15. The data storage device of claim 9 wherein the array is characterized as being a read-only memory (ROM).

16. A data storage device comprising:

an array of memory locations for storing data;

an address input terminal for coupling to an address source and receiving first address signals from the address source;

a data output terminal for coupling to a data reception circuit and connected to the array for receiving data signals therefrom at a memory location indicated by second address signals;

a non-volatile memory having a first memory storage location for storing an encryptor key, the non-volatile memory protecting the encryptor key from direct optical determination;

a latch having an input coupled to the first memory storage location, and an output; and an address encryptor having an input coupled to the latch, and an output coupled to an address input of the array, the address encryptor encoding the first address signals according to the encryptor key to provide the second address signals.

17. The data storage device of claim 16 wherein the non-volatile memory stores the encryptor key using floating gate transistors.

18. The data storage device of claim 16 wherein the non-volatile memory comprises a plurality of second memory storage locations for storing data during a normal operation mode of the data storage device.

19. The data storage device of claim 16 characterized as being a smart card integrated circuit.

\* \* \* \* \*